(12) United States Patent
Albiston et al.

(10) Patent No.: US 7,063,793 B2
(45) Date of Patent: *Jun. 20, 2006

(54) APPARATUS AND METHOD FOR REMOVING MERCURY AND MERCURIC COMPOUNDS FROM DENTAL EFFLUENTS

(75) Inventors: Jason Albiston, Aurora, CO (US); Craig S. Turchi, Lakewood, CO (US); Allan Carlson, Evergreen, CO (US)

(73) Assignee: Ada Technologies, Inc., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/926,577

(22) Filed: Aug. 25, 2004

(65) Prior Publication Data

US 2005/0034651 A1    Feb. 17, 2005

Related U.S. Application Data

(63) Continuation of application No. 09/794,577, filed on Feb. 27, 2001, now Pat. No. 6,797,178.

(60) Provisional application No. 60/267,614, filed on Feb. 9, 2001, provisional application No. 60/239,463, filed on Oct. 10, 2000, provisional application No. 60/191,916, filed on Mar. 24, 2000.

(51) Int. Cl.
*C02F 1/52* (2006.01)
*C02F 1/70* (2006.01)

(52) U.S. Cl. .............. 210/718; 134/22.11; 210/719; 210/729; 210/735; 210/757; 210/914; 433/92

(58) Field of Classification Search ........... 210/702, 210/718, 719, 723–725, 728, 729, 757, 800, 210/804, 764, 914; 433/92, 97; 134/22.11
See application file for complete search history.

(56) References Cited

U.S. PATENT DOCUMENTS

| | | | |
|---|---|---|---|
| 1,697,095 | A | 1/1929 | Turner |
| 2,145,901 | A | 2/1939 | Shoemaker |
| 2,367,496 | A | 1/1945 | Greentree |
| 2,860,952 | A | 11/1958 | Bergeron et al. |
| 3,194,629 | A | 7/1965 | Dreibelbis et al. |
| 3,201,149 | A | 8/1965 | Bragg |
| 3,232,033 | A | 2/1966 | Williston et al. |

(Continued)

FOREIGN PATENT DOCUMENTS

CA    2173171    10/1996

(Continued)

OTHER PUBLICATIONS

Davis, "Aqueous Silica in the Environment: Effects on Iron Hydroxide Surface Chemistry and Implications for Natural and Engineered System," Master's Thesis, Virginia Polytechnic Institute and State University (May 9, 2000), pp. i-30.

(Continued)

*Primary Examiner*—Joseph Drodge
(74) *Attorney, Agent, or Firm*—Sheridan Ross P.C.

(57) ABSTRACT

The present invention is directed to processes for removing a contaminant from dental effluents and includes transporting a three-phase effluent through a suction line into a particle collection vessel, introducing a suction line cleaning solution which includes a reagent into the suction line, and introducing the three phase effluent and the line cleaning solution into the collection vessel, wherein the effluent separates into solid. liquid, and gas phases in the collection vessel and the reagent includes a flocculant and/or a precipitant. and removing the gaseous and liquid phases from the collection vessel. The contaminant includes mercury. lead. and arsenic.

29 Claims, 8 Drawing Sheets

U.S. PATENT DOCUMENTS

| | | |
|---|---|---|
| 3,257,776 A | 6/1966 | Park et al. |
| 3,374,608 A | 3/1968 | Manes |
| 3,499,837 A | 3/1970 | Jaunarajs |
| 3,516,947 A | 6/1970 | Dudzik |
| 3,674,428 A | 7/1972 | Dean et al. |
| 3,677,696 A | 7/1972 | Bryk et al. |
| 3,740,331 A | 6/1973 | Anderson et al. |
| 3,749,761 A | 7/1973 | Dean et al. |
| 3,755,161 A | 8/1973 | Yokota et al. |
| 3,790,370 A | 2/1974 | Lalancette |
| 3,835,217 A | 9/1974 | Dunsmoor |
| 3,847,598 A | 11/1974 | Coulter et al. |
| 3,857,704 A | 12/1974 | Coulter |
| 3,864,327 A | 2/1975 | Marchant |
| 3,873,581 A | 3/1975 | Fitzpatrick et al. |
| 3,876,451 A | 4/1975 | Zall |
| 3,890,225 A | 6/1975 | Kajiyama |
| 3,935,098 A | 1/1976 | Oda et al. |
| 3,947,354 A | 3/1976 | Swanson et al. |
| 3,948,863 A | 4/1976 | Akamatsu et al. |
| 3,961,031 A | 6/1976 | Yasui et al. |
| 3,969,244 A | 7/1976 | Kobayashi et al. |
| 3,984,606 A | 10/1976 | Morgan |
| 3,994,719 A | 11/1976 | Corte et al. |
| 3,999,825 A | 12/1976 | Cannon |
| 4,008,937 A | 2/1977 | Filippi |
| 4,038,071 A | 7/1977 | Di Bella |
| 4,051,316 A | 9/1977 | Wing et al. |
| 4,053,401 A | 10/1977 | Fukushima et al. |
| 4,069,140 A | 1/1978 | Wunderlich |
| 4,072,605 A | 2/1978 | Thelander |
| 4,083,783 A | 4/1978 | Wing et al. |
| 4,087,359 A | 5/1978 | Patron et al. |
| 4,094,777 A | 6/1978 | Sugier et al. |
| 4,101,631 A | 7/1978 | Ambrosini et al. |
| 4,108,769 A | 8/1978 | Krieg et al. |
| 4,110,209 A * | 8/1978 | Vogel .................. 210/706 |
| 4,118,243 A | 10/1978 | Sandesara |
| 4,133,755 A | 1/1979 | Tarao et al. |
| 4,147,626 A | 4/1979 | Findlay et al. |
| 4,151,077 A | 4/1979 | Nogueira et al. |
| 4,153,556 A | 5/1979 | Riedinger |
| 4,160,730 A | 7/1979 | Nguyen |
| 4,196,173 A | 4/1980 | deJong et al. |
| 4,230,486 A | 10/1980 | Capuano et al. |
| 4,233,274 A | 11/1980 | Allgulin |
| 4,238,329 A | 12/1980 | Zievers |
| 4,245,989 A | 1/1981 | Folkenroth et al. |
| 4,249,786 A | 2/1981 | Mahoff |
| 4,256,227 A | 3/1981 | Petrovich |
| 4,256,707 A | 3/1981 | Flynn, Jr. et al. |
| 4,260,494 A | 4/1981 | Dotson et al. |
| 4,273,747 A | 6/1981 | Rasmussen |
| 4,285,564 A | 8/1981 | Spinner |
| 4,340,623 A | 7/1982 | Justus |
| 4,354,942 A | 10/1982 | Kaczur et al. |
| 4,363,749 A | 12/1982 | Weiss et al. |
| 4,377,483 A | 3/1983 | Yamashita et al. |
| 4,385,891 A | 5/1983 | Ligotti |
| 4,419,107 A | 12/1983 | Roydhouse |
| 4,443,417 A | 4/1984 | Wiklund |
| 4,459,370 A | 7/1984 | van der Wal et al. |
| 4,474,896 A | 10/1984 | Chao |
| 4,500,327 A | 2/1985 | Nishino et al. |
| 4,564,374 A | 1/1986 | Hofmann |
| 4,583,999 A | 4/1986 | Lindahl et al. |
| 4,591,437 A | 5/1986 | Ernryd et al. |
| 4,599,177 A | 7/1986 | Hayashi et al. |
| 4,614,592 A | 9/1986 | Googin et al. |
| 4,654,322 A | 3/1987 | Holbein et al. |
| 4,670,160 A | 6/1987 | Moriya et al. |
| 4,693,731 A | 9/1987 | Tarakad et al. |
| 4,695,447 A | 9/1987 | Shultz |
| 4,709,118 A | 11/1987 | Yan |
| 4,721,582 A | 1/1988 | Nelson |
| 4,731,187 A | 3/1988 | Moriya et al. |
| 4,752,398 A | 6/1988 | Holbein et al. |
| 4,753,632 A | 6/1988 | Hofmann et al. |
| 4,764,219 A | 8/1988 | Yan |
| 4,764,355 A | 8/1988 | Romey et al. |
| 4,771,030 A | 9/1988 | Audeh |
| 4,786,483 A | 11/1988 | Audeh |
| 4,786,484 A | 11/1988 | Nelson |
| 4,814,091 A | 3/1989 | Napier et al. |
| 4,814,152 A | 3/1989 | Yan |
| 4,834,953 A | 5/1989 | Audeh |
| 4,843,102 A | 6/1989 | Horton |
| 4,844,815 A | 7/1989 | Ader et al. |
| 4,861,493 A | 8/1989 | Jansen |
| 4,877,515 A | 10/1989 | Audeh .................. 208/251 R |
| 4,892,567 A | 1/1990 | Yan .................. 55/33 |
| 4,902,662 A | 2/1990 | Toulhoat et al. .......... 502/216 |
| 4,909,926 A | 3/1990 | Yan .................. 208/253 |
| 4,909,944 A | 3/1990 | Jackson et al. .......... 210/674 |
| 4,911,825 A | 3/1990 | Roussel et al. ......... 208/251 R |
| 4,915,818 A | 4/1990 | Yan .................. 208/251 |
| 4,917,862 A | 4/1990 | Kraw et al. .................. 423/4 |
| 4,919,826 A | 4/1990 | Alzner .................. 210/788 |
| 4,933,158 A | 6/1990 | Aritsuka et al. .......... 423/210 |
| 4,950,408 A | 8/1990 | Duisters et al. .......... 210/660 |
| 4,962,276 A | 10/1990 | Yan .................. 585/867 |
| 4,969,995 A | 11/1990 | Jackson et al. ........... 210/263 |
| 4,985,389 A | 1/1991 | Audeh .................. 502/516 |
| 4,986,898 A | 1/1991 | Torihata et al. .......... 208/251 |
| 5,017,135 A | 5/1991 | Meyer .................. 433/92 |
| 5,034,054 A | 7/1991 | Woodward .................. 75/388 |
| 5,053,209 A | 10/1991 | Yan .................. 423/210 |
| 5,062,948 A | 11/1991 | Kawazoe et al. .......... 208/251 |
| 5,064,626 A | 11/1991 | Johnson et al. .......... 423/245.1 |
| 5,080,799 A | 1/1992 | Yan .................. 210/661 |
| 5,085,844 A | 2/1992 | Nowack et al. .......... 423/245.1 |
| 5,107,060 A | 4/1992 | Yan .................. 585/823 |
| 5,114,578 A | 5/1992 | Sundström .................. 210/256 |
| 5,120,515 A | 6/1992 | Audeh et al. .......... 423/210 |
| 5,141,724 A | 8/1992 | Audeh et al. |
| 5,154,833 A | 10/1992 | Robinson |
| 5,173,286 A | 12/1992 | Audeh |
| 5,188,530 A * | 2/1993 | Trawoger et al. .......... 433/92 |
| 5,192,163 A | 3/1993 | Fleming |
| 5,200,087 A * | 4/1993 | Nishihara .................. 210/718 |
| 5,202,301 A | 4/1993 | McNamara |
| 5,209,773 A | 5/1993 | Audhe et al. |
| 5,227,053 A | 7/1993 | Brym |
| 5,238,488 A | 8/1993 | Wilhelm |
| 5,245,106 A | 9/1993 | Cameron et al. |
| 5,248,488 A | 9/1993 | Yan |
| 5,294,417 A | 3/1994 | Moore et al. |
| 5,298,168 A | 3/1994 | Guess |
| 5,304,693 A | 4/1994 | Boitiaux et al. |
| 5,308,500 A | 5/1994 | Schwarzbach |
| 5,322,628 A | 6/1994 | Yan |
| 5,330,658 A | 7/1994 | Grant et al. |
| 5,336,835 A | 8/1994 | McNamara |
| 5,338,444 A | 8/1994 | van Buren et al. |
| 5,346,627 A * | 9/1994 | Siefert et al. ............ 210/729 |
| 5,357,002 A | 10/1994 | Lezzi et al. |
| 5,360,632 A | 11/1994 | Johnson et al. |
| 5,369,072 A | 11/1994 | Benjamin et al. |
| 5,370,827 A | 12/1994 | Grant et al. |
| 5,391,217 A | 2/1995 | Zoche |
| 5,409,522 A | 4/1995 | Durham et al. |
| 5,419,884 A | 5/1995 | Weekman et al. |
| 5,421,994 A | 6/1995 | Sarrazin et al. |
| 5,437,797 A | 8/1995 | Helmig |

| | | |
|---|---|---|
| 5,460,643 A | 10/1995 | Hasenpusch et al. |
| 5,463,167 A | 10/1995 | Ou |
| 5,492,627 A | 2/1996 | Hagen et al. |
| 5,523,067 A | 6/1996 | Markovs |
| 5,536,416 A | 7/1996 | Coltrinari et al. |
| 5,569,436 A | 10/1996 | Lerner |
| 5,577,910 A | 11/1996 | Holland |
| 5,599,515 A | 2/1997 | Misra et al. |
| 5,607,496 A | 3/1997 | Brooks |
| 5,613,851 A | 3/1997 | Trawöger et al. |
| 5,658,487 A | 8/1997 | Carey et al. |
| 5,667,695 A | 9/1997 | Bedard et al. |
| 5,670,122 A | 9/1997 | Zamansky et al. |
| 5,679,259 A | 10/1997 | Bolser |
| 5,695,726 A | 12/1997 | Lerner |
| 5,741,397 A | 4/1998 | Kraver |
| 5,753,125 A | 5/1998 | Kreisler |
| 5,788,852 A * | 8/1998 | Mescon ............. 210/749 |
| 5,795,159 A | 8/1998 | Ralls et al. |
| 5,797,742 A | 8/1998 | Fraker |
| 5,846,434 A | 12/1998 | Seaman et al. |
| 5,880,060 A | 3/1999 | Blake et al. |
| 5,885,076 A | 3/1999 | Ralls et al. |
| 5,898,093 A | 4/1999 | Vos |
| 5,900,042 A | 5/1999 | Mendelsohn et al. |
| 5,907,037 A | 5/1999 | Gujral et al. |
| 5,908,559 A | 6/1999 | Kreisler |
| 5,919,001 A | 7/1999 | Lin |
| 5,922,277 A | 7/1999 | Donhoff et al. |
| 5,967,965 A | 10/1999 | Vyshkina et al. |
| 5,976,270 A | 11/1999 | Zelez et al. |
| 5,976,383 A | 11/1999 | Guess et al. |
| 5,986,161 A | 11/1999 | Akae et al. |
| 6,022,216 A | 2/2000 | Cattani |
| 6,024,239 A | 2/2000 | Turner et al. |
| 6,083,306 A | 7/2000 | Cattani |
| 6,083,473 A | 7/2000 | Esquivel et al. |
| 6,103,205 A | 8/2000 | Wojtowicz et al. |
| 6,132,623 A | 10/2000 | Nikolaidis et al. |
| 6,139,485 A | 10/2000 | Pal et al. |
| 6,139,751 A | 10/2000 | Bogaert et al. |
| 6,153,108 A | 11/2000 | Klock et al. |
| 6,165,366 A | 12/2000 | Sarangapani |
| 6,214,304 B1 | 4/2001 | Rosenthal et al. |
| 6,270,679 B1 | 8/2001 | Kreisler |
| 6,274,045 B1 | 8/2001 | Kreisler |
| 6,284,208 B1 | 9/2001 | Thomassen |
| 6,294,139 B1 | 9/2001 | Vicard et al. |
| 6,322,613 B1 | 11/2001 | Wojtowicz et al. |
| 6,372,187 B1 | 4/2002 | Madden et al. |
| 6,375,909 B1 | 4/2002 | Dangtran et al. |
| 6,387,276 B1 | 5/2002 | Nikolaidis et al. |
| 6,403,044 B1 | 6/2002 | Litz et al. |
| 6,447,740 B1 | 9/2002 | Caldwell et al. |
| 6,524,371 B1 | 2/2003 | El-Shoubary et al. |
| 6,533,842 B1 | 3/2003 | Maes et al. |
| 6,534,024 B1 | 3/2003 | Honjo et al. |
| 6,558,642 B1 | 5/2003 | El-Shoubary et al. |
| 6,656,423 B1 * | 12/2003 | Joslyn .................. 422/1 |
| 6,719,828 B1 | 4/2004 | Lovell |
| 6,797,178 B1 * | 9/2004 | Albiston et al. ......... 210/702 |
| 6,911,570 B1 | 6/2005 | Broderick et al. |
| 2003/0099585 A1 | 5/2003 | Aligulin |

FOREIGN PATENT DOCUMENTS

| | | |
|---|---|---|
| CA | 2173271 | 2/1999 |
| DE | 3813 264 A1 | 11/1988 |
| DE | 41 23907 A1 | 1/1993 |
| DE | 44 22 468 A1 | 1/1996 |
| JP | 48026672 A | 4/1973 |
| JP | 51069483 | 6/1976 |
| WO | WO 02/096559 A1 | 5/2001 |

OTHER PUBLICATIONS

"Future Water Needs in Colorado," Colorado State Demographer (1994), available at http://waterknowledge.colostate.edu/future.htm, 1 pg.

Kiura et al., "Bactericidal Activity of Electrolyzed Acid Water from Solution Containing Sodium Chloride at Low Concentration, in Comparison with that at High Concentration," *Journal of Microbiological Methods*, vol. 49 (2002), pp. 285-293.

Kraft et al., "Electrochemical Water Disinfection Part I: Hypochlorite Production from Very Dilute Chloride Solutions," *Journal of Applied Electrochemistry*, vol. 29 (1999), pp. 861-868.

"List of Drinking Water Contaminants & MCLs," US Environmental Protection Agency; (Last updated Mar. 18, 2004), pp. 1-12 and 1-6.

Mollah et al., "Electrocoagulation (EC)—Science and Applications," *Journal of Hazardous Materials*, B84 (2001), pp. 29-41.

Morita et al., "Disinfection Potential of Electrolyzed Solutions Containing Sodium Chloride at Low Concentrations," *J Viro Methods* vol. 85(1-2) (Mar. 2000), pp. 163-174.

Nolan, "National Statistical Analysis of Nutrient Concentration in Ground Water," available at http://water.usgs.gov/nawqa/nutrients/datasets/nutconc2000/; 4 pgs.

Renk, "Treatment of Hazardous Wastewaters by Electrocoagulation," Colorado Hazardous Waste Management Society (Nov. 6-7, 1989), 12 pgs.

Woodwell et al., "Water Efficiency for Your Home," *Rocky Mountain Institute* (3rd Ed. 1995), pp. 1-18.

Maximum Separation Systems brochure, undated, 7 pgs.

Maximum Product Information brochure, undated, 3 pgs.

Maximum brochure, undated, 3 pgs.

Metasys brochure, undated, 1 pg.

ADA Final Progress Report Entitled "Cleanup of Dental Amalgam to Meet Sewer Discharge Regulations"; Grant No. 1 R43 ES07886-01, Apr. 28, 1997.

Bindslely; "Dental Office Waste Stream Characterization Study";Royal Dental College, Adv. Dent. Res. 6:125-130, Sep. 1991.

Bill Johnson; Technical Memorandum on "Mercury Source Identification Update: Dental Offices and Human Waste"; EIP Associates; Mar. 2, 1999.

"Scientific Review of Issues Impacting Dentistry"; Naval Dental Research Institute; vol. 2, No. 1, Jan. 2000.

Pederson et al.; "The Removal of Mercury from Dental-operatory Wastewater by Polymer Treatment"; Naval dental Research Institute vol. 107, No. 1, Jan. 1999.

Kümmerer et al.; "Mercury Emissions from Dental Chairs by Disinfection"; Chemosphere, vol. 35, No. 4, pps. 827-833, 1997.

Fan et al.; "Environmental issues in dentistry—mercury"; FDI/World Dental Journal (1997)47, 105-109.

"Best Management Practices for Dental Waste" City of Boulder Public Works/Utilities; 9 pgs.

Batchu et al., "Comparison of Particle Size Distributions of Dental Wastewater under various Clinical Procedures"; Naval Dental Research Institute, Illinois.

Cailas et al., "Physico-chemical Properties of dental Wastewater"; Water Environmental Federation, 1994.

Arenholt-Bindsley et al.; "Mercury Levels and Discharge in Waste Water from Dental Clinics"; Waste, Air and Soil Pollution; 86:93-99, 1996.

Letzel et al.; "An Estimation of the Size Distribution of

Amalgam Particles in Dental Treatment Waste"; J. Dent.Res. 76(3): 780-788; Mar. 1997.

Jan. 20, 2003 print-out of E-watertechnologies' website at http://www.e-watertechnologies.com regarding Whole House Anion Water Conditioner, 2 pages.

Jan. 20, 2003 print-out of E-watertechnologies' website at http://www.e-watertechnologies.com regarding Whole House Reverse Osmosis System, 4 pages.

Jan. 20, 2003 print-out of Wholly Water® website at http://www.wholly-water.com regarding The Ultimate Drinking Water Purification System, 9 pages.

Jan. 20, 2003 print-out of Prostar Mechanical Technologies Ltd. website at http://www.prostar-mechanical.com regarding Water Purification Systems and Equipment, 4 pages.

Jan. 20, 2003 print-out of A1 Ultra Pure Drinking Water's website at http://www.a1ultrapure.com/drink.html regarding Drinking Water Systems, 8 pages.

Jan. 21, 2003 print-out of Apyron Technologies' website at http://www.apyron.com/home.html beginning with home page and including The Complete Arsenic Treatment Solution, 15 pages.

Jan. 20, 2003 print-out of USFilter website at http://www.usfilter.com/water regarding GFH™ Granular Ferric Hydroxide Media, 2 pages.

Jan. 20, 2003 print-out of Sevem Trent Services at http://www.sevemtrentservices.com regarding SORB33, 2 pages.

Jan. 20, 2003 print-out of ADI website at http://www.adi.ca regarding Arsenic Removal, 1 page.

Jan. 20, 2003 print-out of TRAMFLOC, Inc. website at http://www.tramfloc.com regarding Application of ActiGuard AAFS50 to Arsenic Removal, 3 pages.

Jan. 20, 2003 print-out of Waste Technologies of Australia Pty. Ltd. (Arsenic Solutions Information Page, Solutions and Resources) at http://www.arsenic-solutions.com regarding Simple Arsenic Removal Process (site under reconstruction), 2 pages.

Jan. 20, 2003 print-out of WRT website at http://wrtnet.com regarding The Z-33™ Arsenic Removal Process, 1 page.

Agion Antimicrobial, Agion Technologies L.L.C., The Most Advanced Antimicrobial Silver Delivery System, An Introduction, 10 page.

Bayer Corporation, Plastics Division, "Wheel Covers, Center Caps Become Revolving Art Forms With New Film Insert Molding Technology," 4 pages.

Brown, et al; "Mercury Measurement and Its Control; What We Know, Have Learned, and Need to Further Investigate;" J. Air & Water Manage. Assoc., pp. 1-97; Jun. 1999.

Gash, et al; "Efficient Recovery of Elemental Mercury from Hg(II)-Contaminated Aqueous Media Using a Redox-Recyclable Ion-Exchange Material;" Environ. Sci. Technol. 1988, 32, 1007-1012.

Dorhout and Strauss; "The Design, Synthesis, and Characterization of Redox-Recyclable Materials for Efficient Extraction of Heavy Element Ions from Aqueous Waste Streams;" 1999 American Chemical Society, pp. 53-68.

Rose, Arthur W., Hawkes, Herbert E., Webb, John S., "Geochemistry in Mineral Exploration," Second Edition, 1979, 3 pgs.

Listing of Abstracts from Int'l Conference "Arsenic in Bangladesh Ground Water: World's Greatest Arsenic Calamity," Feb. 22-28, 1999, 22 pgs.

EPA "Arsenic in Drinking Water: Treatment Technologies for Arsenic Decision Tree, Variances and Exemptions," Jun. 2-3, 1999, 9 pages.

Driehaus, et al., "Granular ferric hydroxide—a new absorbent for the removal of arsenic from natural water," J. Water SRT—Aqua 47, 1998, abstract and pp. 59-68.

Murcott, Susan, Appropriate Remediation Technologies for Arsenic-Contaminated Wells, Massachusetts Institute of Technology, "Arsenic in Bangladesh Ground Water" Wagner College, Staten Island, New York, Feb. 27-28, 1999, 13 pgs.

ADA Technologies, Inc., "Turnkey Arsenic Removal for Small Water Systems," Topic #AF03-265, Proposal #F031-0720, 3 pgs.

Stewart et al., "Stabilization of Radioactively Contaminated Elemental Mercury Wastes," DOE Spectrum 1998 Conference.

Sittig, 1973, Pollutant Removal Handbook: 286-294.

Grant et al., 1987, Grant & Hackh's Chemical Dictionary: 25, 29.

Barth, 1990, The SITE Demonstration of the CHEMFIX Solidification/Stabilization Process at the Portable Equipment Salvage Company Site: 166-170.

Huang et al., 1991, Emissions of Airborne Toxics from Coal-Fired Boilers: Mercury: 13-16.

Superfund Innovative Technology Evaluation, 1992.

Trezek, 1992, Remediation of Heavy Metals in Soils and Sludges: 1-5.

Darnell et al., 1992, Full-Scale Tests of Sulfur Polymer Cement and Non-radioactive Waste in Heated and Unheated Prototypical Containers: iii-A-8.

Blumbach et al., 1992, Sorbalit—A New Economic Approach Reducing Mercury and Dioxin Emissons: 2-20.

Hartenstein, 1992, A Fixed Bed Activated Coke/Carbon Filter as a Final Gas Cleaning Stage Retrofitted for a Hazardous Waste Incineration Plant—The First 6 Months of Operating Experience: 2-16.

Gorin et al., 1994, Final Disposal Options for Mercury/Uranium Mixed Wstes From the Oak Ridge Reservation: iii-21.

Daryl R., 1998, ADA Technologies, Inc. Memorandum.

1998, ADA Process for Stabilizing Radioactively Contaminated Elemental Mercury a Success, VIII (3): 1-4.

Brown, 2000, Stabilization of Mercury Containing Wastes.

2000, Soil Screening Guidance for Radionuclides: User's Guide: i-C-8.

Davis et al., Mercury Mixed Waste Treatment: 13-23.

Darco FGD Activated Carbon for Removal of Mercury and Dioxin From Flue Gas: 1-5.

Conley, Hg Working Group/Treatment Demonstrations [3PCK]: 1-4.

Broderick et al., Mercury Control and Treatment Processes for Solid, Liquid and Gas Streams.

Tyson, 1992, Treatability Study for the Amalgamation of a Radioactively Contaminated Elemental Mercury Waste at the Idaho National Engineering Laboratory.

Faulkner et al., Size Reduction: 132-162.

Roberts, et al. "Stabilization of Radioactively Contaminated Elemental Mercury Wastes," Paper No. 36-6, WM '98, Tucson, Arizona Mar., 1998.

* cited by examiner

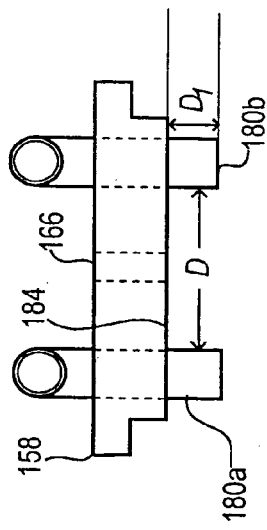
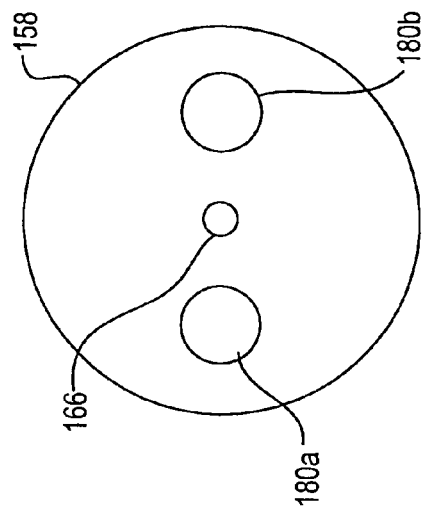
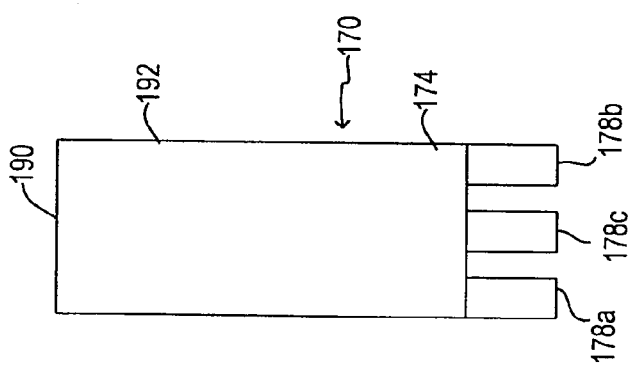
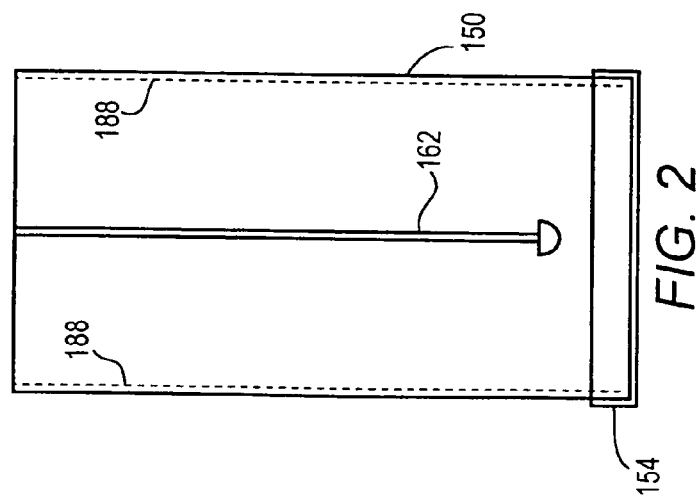

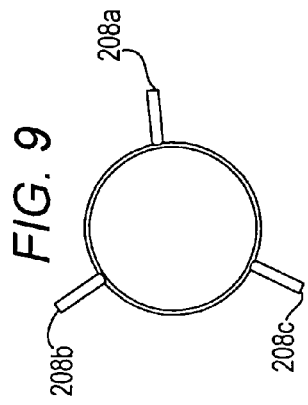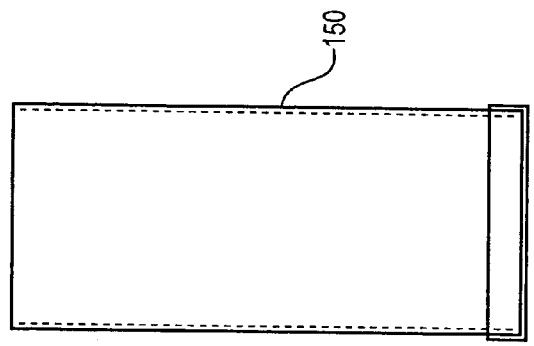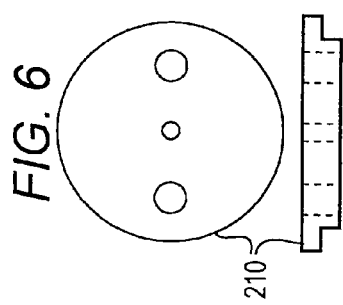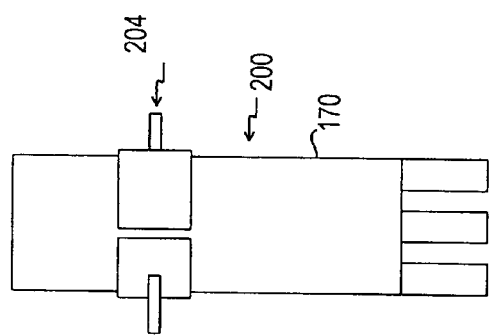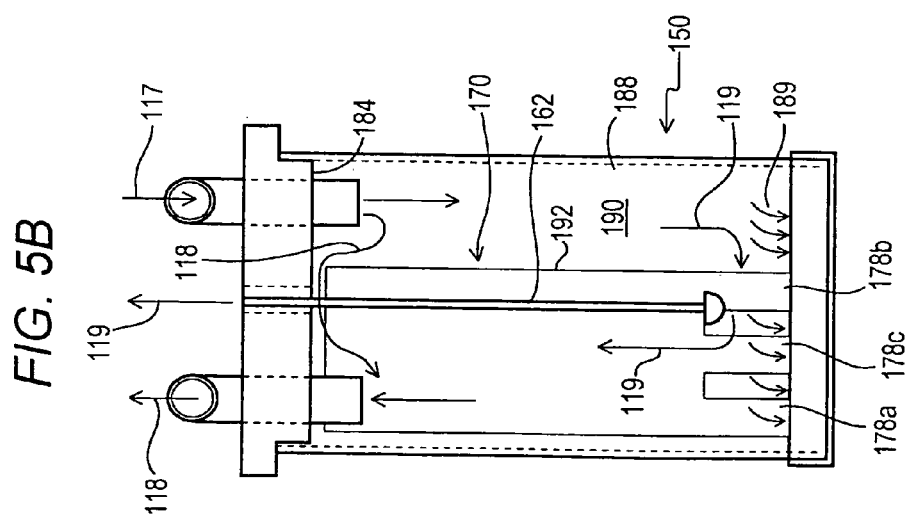

APPARATUS AND METHOD FOR REMOVING MERCURY AND MERCURIC COMPOUNDS FROM DENTAL EFFLUENTS

CROSS REFERENCE TO RELATED APPLICATION

The present application is a continuation of U.S. patent application Ser. No. 09/794,577 filed Feb. 27, 2001, entitled "APPARATUS AND METHOD FOR REMOVING MERCURY AND MERCURIC COMPOUNDS FROM DENTAL EFFLUENTS" (now U.S. Pat. No. 6,797,178), which claims the benefits of U.S. Provisional Application Ser. Nos. 60/191,916, filed Mar. 24, 2000; 60/239,463, filed Oct. 10, 2000; and 60/267,6 14, filed Feb. 9, 2001, all of which are incorporated herein by reference in their entireties.

NOTIFICATION OF FEDERAL RIGHTS

This invention was made with Government support under Grant No. 5R44DE13081-03 awarded by the National Institutes of Health. The government has certain rights in the invention.

FIELD OF THE INVENTION

The present invention relates generally to removing mercury and mercury-containing compounds from liquid wastes and specifically to removing mercury and mercury-containing compounds from dental effluents.

BACKGROUND OF THE INVENTION

Each year tens of thousands of pounds of mercury-containing wastes are discharged by dental offices into municipal waste systems. Amalgam fillings typically contain about 50% mercury by weight. Mercury is a known environmental contaminant, classified by the USEPA as a persistent, bioaccumulative, and toxic material. Waste water treatment plants must meet strict limits on the amount of mercury they can release. The discharged form of mercury is typically highly toxic (i.e., unstable) and in violation of applicable environmental regulations. Although particulate removal systems used in some dental offices remove mercury-containing particles, they do not remove dissolved mercury and mercury-containing compounds. Examples of such devices are described in U.S. Pat. Nos. 5,885,076; 5,797,742; 5,795,159; 5,577,910; 5,227,053; 4,753,632; 4,591,437; 4,385,891; and 5,114,578, all of which are incorporated herein by this reference.

SUMMARY OF THE INVENTION

The present invention provides a method and apparatus for removing solid amalgam particles and/or soluble forms of mercury and other metals (such as silver) and other contaminants from dental effluents.

In one embodiment, a contaminant removal system is provided for treating a three-phase effluent. The system includes:
  (a) a particle collection vessel for separating a gas phase, a liquid phase, and a solid (particulate) phase in the three-phase of effluent;
  (b) a first discharge line from the vessel for removing the liquid phase from the vessel;
  (c) a second discharge line from the vessel for removing the gas phase from the vessel; and optionally
  (d) a liquid treatment device for removing and/or stabilizing contaminants in the liquid phase to form a treated liquid phase. The contaminant can be any undesirable organic or inorganic material in the effluent. Examples include metals (e.g., mercury, lead, arsenic, etc.), metal compounds, bacteria, pathogens, inorganic and organic solvents, and mixtures thereof.

The particle collection vessel can be of any suitable design. For example, the vessel can be a settling tank, a sedimentation device, a centrifuge, or any other device that utilizes gravity or centrifugal forces for effectuating solids/liquid separation. In one configuration, the particle collection vessel includes one or more baffles to facilitate solid/liquid/gas separation.

To remove the liquid phase from the particle collection vessel, the system can include a timer connected to a pump on the first discharge line to cause periodic removal of the liquid phase from the vessel during periods when no waste is incoming (e.g., overnight). In this manner, the liquid is provided with a relatively quiescent period for effective settlement of entrained particles such as amalgam particles.

The liquid treatment device can be any suitable device for removing and/or stabilizing contaminants in the liquid phase to form the treated liquid phase. In one configuration, the liquid treatment device includes one or more devices for adding chemical additives, such as one or more of a pH adjustor, an oxidant, a reductant, and a precipitant with the liquid phase. In one configuration, the liquid treatment device includes one or more sorbent columns that contact the liquid phase with one or more sorbents.

The effluent can be any contaminated effluent regardless of the source. In a preferred configuration, the effluent is produced by dental work on a patient. The effluent is collected by a liquid collection device, such as a sink, suction tube or, evacuation line, and conveyed to the particle collection vessel via a waste discharge line. A single particle collection vessel can service a plurality of such liquid collection devices corresponding to a plurality of dental chairs.

In another embodiment, a process is provided for removing dissolved contaminants from the three-phase effluent. The process includes the steps of:
  (a) introducing the three-phase effluent into a particle collection vessel;
  (b) reducing the velocity of and/or redirecting the direction of movement of the effluent, thereby causing a solid phase and a liquid phase to separate from a gas phase;
  (c) removing the gas phase from the collection vessel;
  (d) removing the liquid phase from the collection vessel; and optionally
  (e) contacting the liquid phase with at least one of an additive and a sorbent to form a treated liquid phase.

As noted, the liquid phase can be removed discontinuously from the collection vessel to provide more effective separation of the entrained particles from the liquid phase.

In one configuration, the contacting step further includes the steps of;
  (f) first contacting the liquid phase with one or more of a reductant, an oxidant, a participant, and a pH adjustor I (typically prior to removal of the liquid phase); and
  (g) second contacting the liquid phase with a sorbent to remove mercury therefrom. In another configuration, step (g) is optional.

As will be appreciated, the additive, preferably a reactant (a compound that will react with the contaminant, such as a reductant, oxidant, and/or precipitant), maybe used in the absence of (or without) a sorbent. For example, the reactant could be a precipitant that forms a precipitate with the contaminant. The precipitate could be removed from the effluent by ifiltration techniques, gravity separation techniques, etc. A flocculant, such as aluminum or commercially available polymers, could be further added to the effluent to act as a filter and/or settling aid.

The system and method can provide numerous benefits. For example, the system can remove not only solid amalgam particles but also remove and/or stabilize dissolved elemental mercury and speciated mercury. The system and method can be effective at capturing a high percentage of the amalgam particles. The vessel typically captures or collects at least most and more typically at least about 95% of all amalgam particles that are about 10 microns or greater in size. The chemical treatment device can further remove at least most of the amalgam particles that are less than about 10 microns in size. Amalgam particles typically represent at least 95% of the total mercury sent to the system. Any of the system components can be used as a recycling device. For example, the collection vessel or sorbent column can be operated for a predetermined period (typically 6–12 months) after which the vessel and/or column is replaced. The used vessel and/or column is shipped to a recycling facility to recover the captured amalgam particles and/or elemental and speciated mercury. The system can operate effectively without a sorbent. Proper selection of the additives can remove the need for a sorbent.

BRIEF DESCRIPTION OF THE DRAWINGS

FIG. 2 is a side view of the vessel;

FIG. 3 is a side view of the baffle assembly;

FIG. 4 is a side view of the cap to the vessel;

FIG. 5A is a plan view of the cap;

FIG. 5B is a cross-sectional view of the particulate collection vessel in operation;

FIG. 6 is a top view of the cap according to another embodiment of the present invention;

FIG. 8 is a side view of the baffle assembly engaging the spacing assembly;

FIG. 9 is a top view of the spacing assembly;

FIG. 10 is a side view of the cap;

DETAILED DESCRIPTION

The Particulate Collection System

Figure 1A:
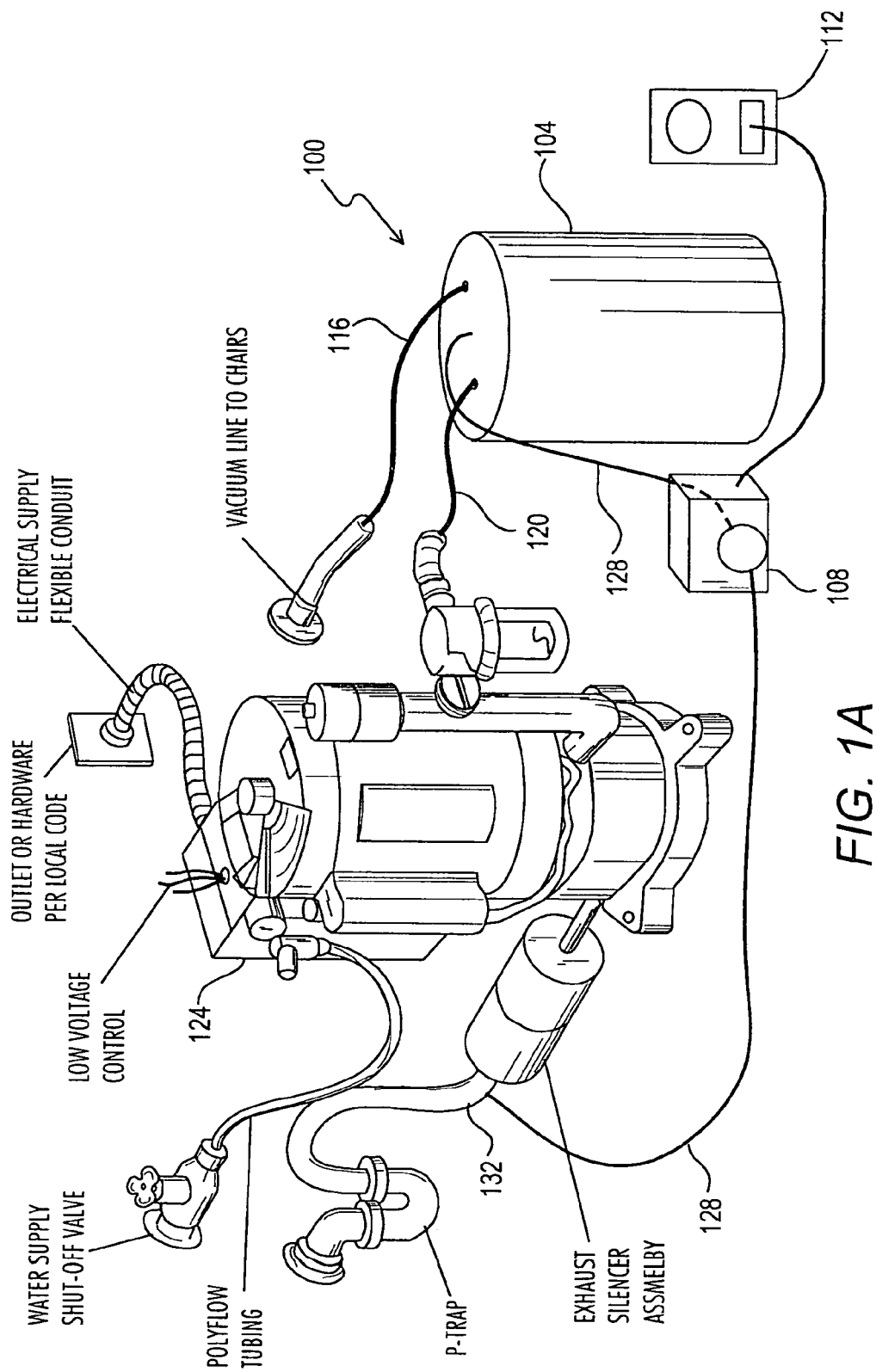
FIG. 1A is a perspective view of a particulate collection vessel in accordance with one embodiment of the present invention.
Figure 1B:
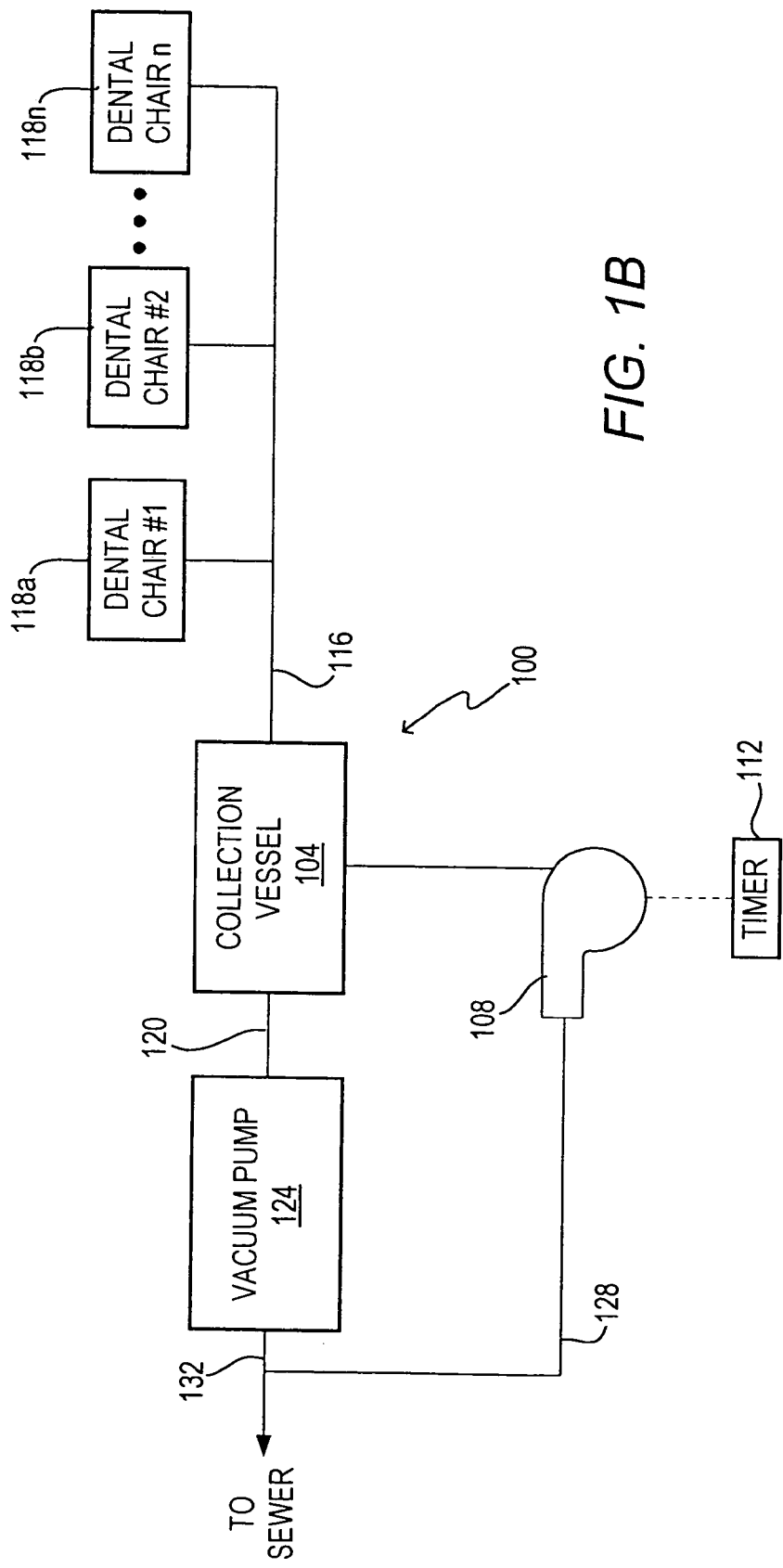
FIG. 1B is a flow schematic of the embodiment of FIG. 1A.
Figure 7:
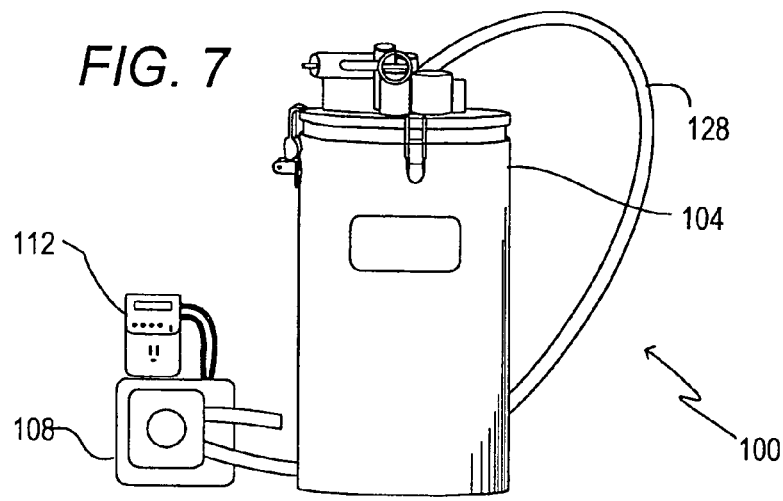
FIG. 7 is a perspective view of the particulate collection system.

A first embodiment of the present invention is depicted in FIGS. 1–5 and 7. The particulate collection system 100 includes a collection vessel 104, a pump 108 (e.g., a peristaltic pump), and a timer 112 (e.g., an electronic 24/7 timer). The collection vessel 104 is located between the vacuum line 116 to the chairs 118a–n and the vacuum line 120 to the vacuum pump 124. Thus, the vessel 104 is typically installed on the suction side of the vacuum pump 124, preferably close to the vacuum pump. A liquid discharge line 128 is connected to the pump 108 and from the pump 108 to the exhaust hose 132 from the vacuum pump 124 to the sewer (not shown).

The timer 112 is connected to the pump 108 to cause discontinuous discharge of the liquid waste (or liquid phase) from the collection vessel 104. The timer 108 ensures that there is a sufficient (predetermined) settling time (in which the liquids and solid phases are relatively quiescent) prior to activating the pump 108 to discharge the (supernatant) wastewater or liquid phase. Typically, the predetermined settling time (between pump activation cycles) ranges from about 1 to about 24 hrs and more typically from about 8 to about 12 hrs. The discharge is performed at a controlled, slow rate (typically in the range of from about 10 to about 1000 ml/min and more typically in the range of from about 20 to about 200 ml/min).

FIGS. 2–5 depict the various components of the collection vessel 104. The collection vessel 104 includes a central housing 150, a base 154 attached to the bottom of the housing 150, a cap 158 attached to the top of the housing 150, a dip tube 162 connected to passage 166 in the cap 158, and a baffle assembly 170. The dimensions of the vessel 104 typically range from about 10 to about 25 inches high and about 5 to about 25 inches in diameter.

The baffle assembly 170 includes a cylindrical baffle tube 174 having a plurality of supporting legs 178a–c spaced at intervals around the bottom of the baffle tube 174. The inner and outer radii of the baffle tube 174 are less than the inner radius of the housing 150 so that the baffle assembly can be received inside of the housing. Typically, the inner and outer radii of the baffle tube 174 are no more than about 50% of the inner housing 150 radius and typically are no less than about 10% of the inner housing 150 radius. The baffle tube 174, of course, has a hollow interior to permit fluids to flow upwardly and/or downwardly through the tube as shown. The dip tube 162 is positioned inside of the baffle tube 174 during use and at or near the central vertical axes of the housing 150. The baffle tube 174 is located such that the dip tube 162 and the cap outlet port 180a are located inside the cylindrical housing of the tube.

The cap 158 includes two conduits 180a,b that pass through the cap 158 and project a distance "$D_1$" (typically from about 0.5 to about 3 inches below the cap surface 184. The conduits 180a,b connect to the vacuum lines 120 and 116, respectively. The distance "D" is sufficient to hold the baffle tube 174 in position within the housing 150 (i.e., under ports 166 and 180a) during use.

The collection vessel 104 and baffle assembly 170 can be made of any suitable material, with corrosion resistant plastics, such as PVC being preferred.

In operation, a three-phase mixture 117 of gas, solids or particles (e.g., mercury amalgam particles), and liquid from the dental chair(s) passes through vacuum line 116 and into the annular area 190 between the exterior surface 192 of the baffle tube 170 and the interior surface 188 of the housing 150. The velocity of the mixture is slowed by the large flow area within the vessel, causing solid particles 189 to settle out of the mixture and collect in the bottom of the housing 150. The gas phase 118 of the mixture passes above (i.e., the top 190 of the baffle tube 170 is typically spaced from the cap bottom 184) and around baffle tube 170 (i.e., the baffle tube exterior 192 is typically spaced from the housing interior around the baffle tube's periphery). The liquid phase 119 also settles out of the gas phase (due to the decrease in gas velocity) and collects in the bottom of the housing with the particles. Baffle tube 170 forces the liquid flow between legs 178a–c in order to exit vessel 150 via either dip tube 162 or outlet port 180a. This flow path will create some particle separation (albeit less than in normal operation) in the event that the vessel 150 overflows. Periodically, the pump 108 is activated by the timer 112 and draws collected liquid phase out of the bottom of the housing via dip tube 162 and discharges the liquid phase through discharge line 128 into the exhaust hose 132. The pump 108 is typically activated at a time interval ranging from about 5 mins. to about 12 hrs, more typically from about 2 to about 12 hours, and even more typically from about 2 to about 6 hours. The flow rate of pump 108 is low enough, typically about 0.02 to about 1 l/min., to prevent entrainment of the settled particles. The dip tube 162 design prevents particles from being withdrawn with the liquid and, therefore, the particles remain in the bottom of the housing 150.

The system has numerous operational benefits. The system can be effective at capturing about 95% of all particles that are greater than about 10 micron in size. This fraction of particles typically amounts to about 95% of the total mercury sent to the system. The system can be a self-priming system and will hold a vacuum when turned off. The pump can run dry without damaging the motor or the drive unit. The unit can be used as a recycling device. After the unit operates for a predetermined period (typically six to twelve months) the vessel is replaced with a new vessel and the used vessel shipped to a recycling facility to recover the captured amalgam particles. The vessel can remove fine amalgam particles that can damage the dental vacuum pump.

Installation of the system depends on the application. The system is designed to work with either wet- or dry-vacuum systems. In a dry-vac system, it is preferred that the vessel be installed upstream of the dry vac's air/water separator. The existing air/water separator may be removed; however, it is recommended that the existing air/water separator be left in place to protect the vacuum pump in the event that the vessel overfills. Because liquids will not damage a wet-vac pump, no such precaution is required for a wet system. If installed downstream of an existing air/water separator, the system is typically installed to receive the liquid outlet flow from the air/water separator. Different size clinics can be accommodated by adjusting the overall size of the system. In one configuration, the system is designed so that if any problem occurs with the unit, fluid flow will bypass the vessel and allow continued operation of the dental suction system.

FIGS. 6 and 8–10 show a particle collection system according to another embodiment of the present invention. The baffle assembly 200 includes a spacer assembly 204 that engages the upper end of the baffle tube 170. Spacers 208a–c are positioned at intervals around the periphery of the baffle tube 170 to maintain the correct, spaced relationship between the tube wall and the housing interior. Because the spacer assembly 204 maintains the tube exterior in a spaced apart relationship relative to the housing wall, the cap 210 does not require downwardly projecting conduits 180a,b.

The Combined Particulate Removal and Purification System

Figure 12:
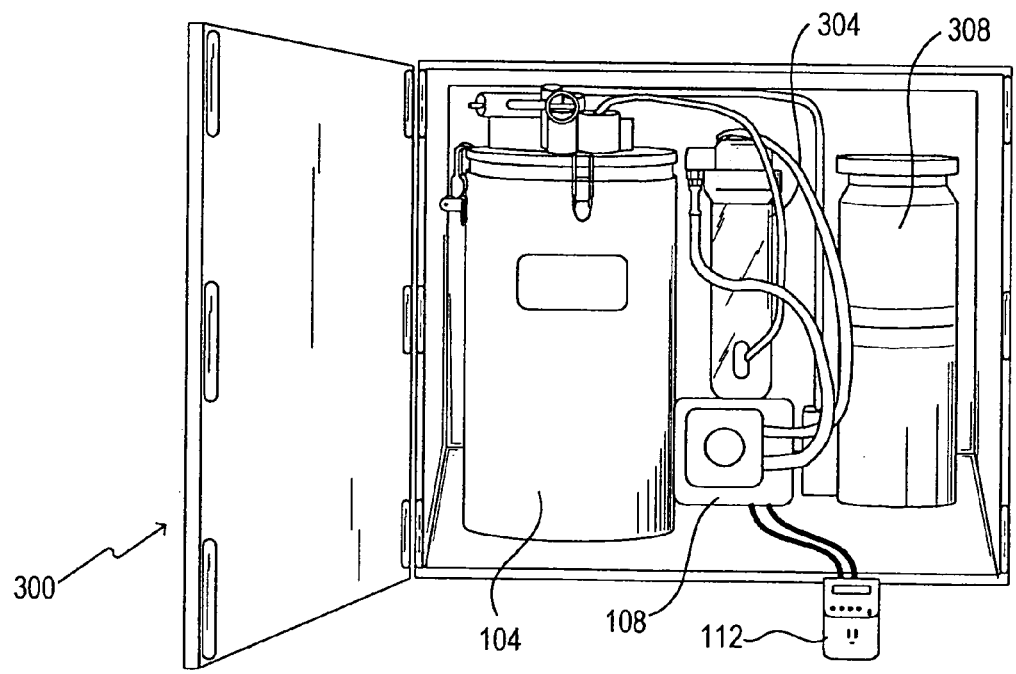
FIG. 12 is a view of the various components installed in an enclosure.
Figure 11:
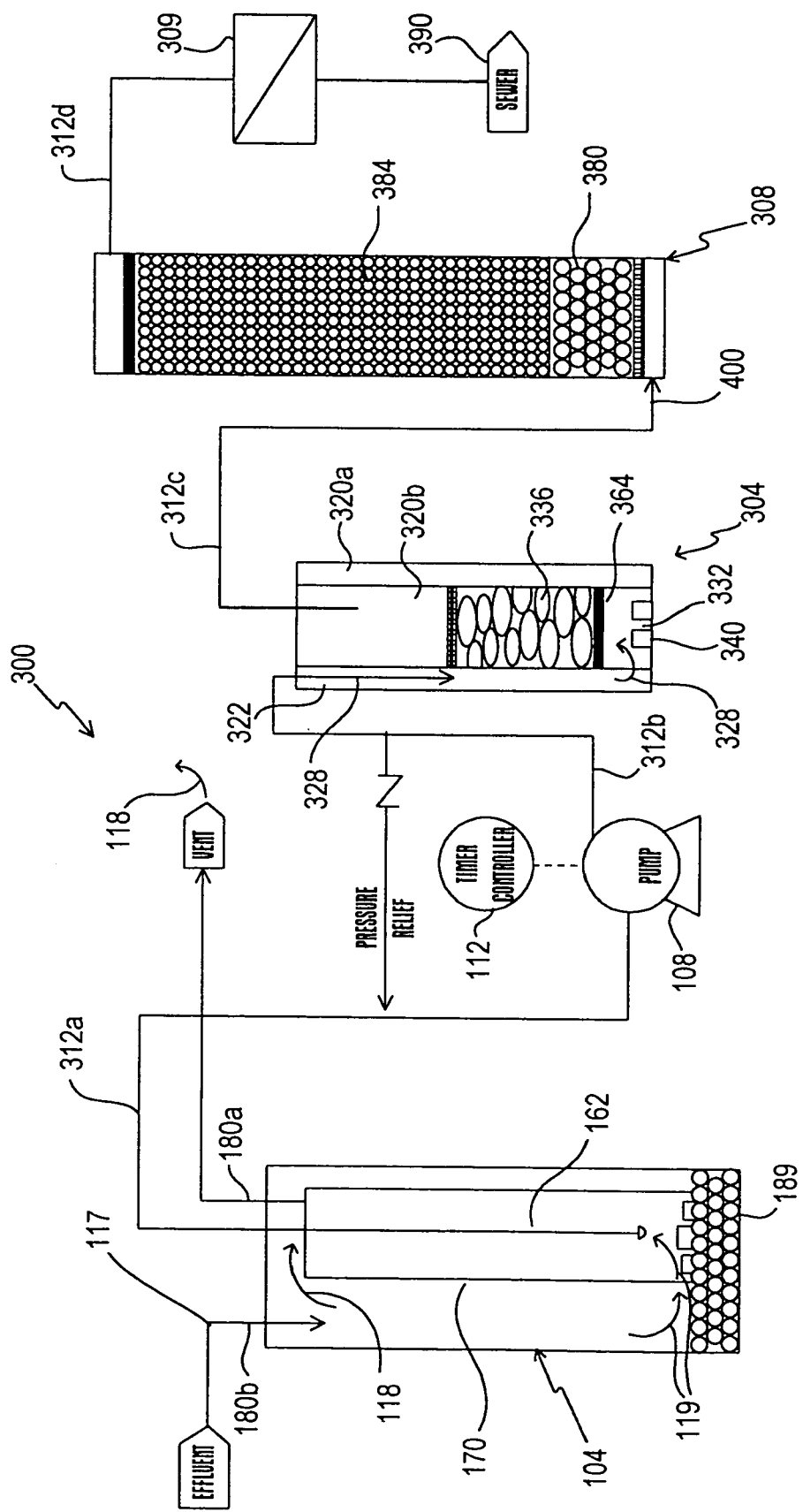
FIG. 11 is a block diagram showing the various components of a mercury removal system according to another embodiment of the present invention.
Figure 13:
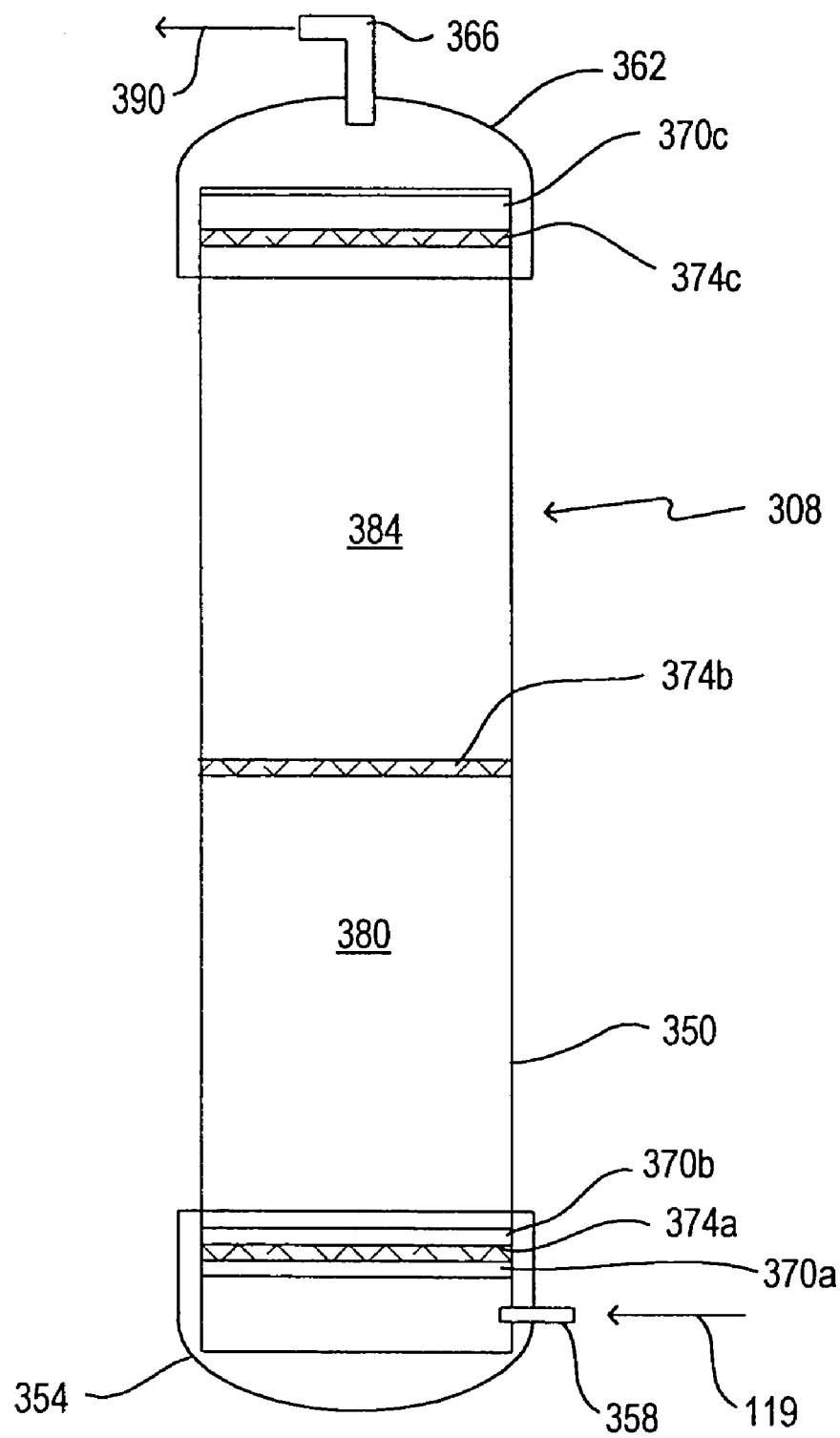
FIG. 13 is a cross-sectional view taken along line 10-10 of the sorbent column of FIG. 9.

Referring to FIGS. 11–13, the combined particulate removal and purification system 300 will now be discussed. The system removes and/or stabilizes soluble forms of mercury as well as solid-phase mercury. Soluble forms of mercury are typically present in the dental wastewater from the reaction of the mercury in amalgam particles with the wastewater which releases soluble forms of mercury into the wastewater.

The system 300 includes the particulate collection vessel 104 described above and, in addition, a chemical doser 304 and a sorbent column 308 and sub-micron filter 309. The doser 304 and sorbent column 308 are in communication with discharge line 312 and pump 108. Pump output line 312b is connected to the doser 304 and an output line 312c from the doser 304 is connected to the sorbent column 308. The output line 312d from the sorbent discharges into the sewer or line 128.

As will be appreciated, the dissolved mercury-containing compounds, colloidal mercury, and small (e.g., less than about 10 microns) amalgam particles in the waste liquid from the particulate collection vessel are removed and/or stabilized by the doser 304 and sorbent column 308 and polishing sub-micron filter 309.

One or more dosers 304 can be used to directly reduce mercury levels in the wastewater and/or adjust wastewater chemistry. A doser will typically release one or more suitable additives to the wastewater to maintain desirable chemical properties, to convert dissolved mercury to a less soluble form of mercury, or enhance the performance of a mercury-selective sorbent in the sorbent column 308 in removing dissolved mercury from dental amalgam wastewater, and/or to kill or neutralize organic material in the wastewater. Suitable solid additives are preferably nontoxic and sparingly soluble in the wastewater so that they are slowly released into the water. Alternately, the additive could be added by any other suitable technique. For example, the additive can be slowly added (as a liquid, solid, or gas) via a dosing mechanism (e.g., a pump) or by encapsulation in a slowly dissolving substance.

In another embodiment, the reagent can be added to the collection vessel via the dental suction line. For example, most dental offices flush a suction line cleaning solution through their evacuation system. The reagent could be added in the same method, or be co-blended, with the line cleanser. In this case, the additive is added to and in the effluent upstream of the collection vessel and further additive addition(s) in or downstream of the collection vessel is/are optional. The blending could be done during or after production of the cleanser. The blending can be done by known techniques such as by using a ribbon blender. Typical dental line cleansers contain surfactants and disinfectants and may range in pH from acid to highly basic. Active ingredients include sodium hydroxide (Alprojet™), chloramine T (Tiutol™, Aseptoclean 2™), sodium perborate or another percarbonate, hydrogen peroxide (Orotol Ultra™), ammonium chloride (S&M matic™, Vacusol™), sodium hypochlorite (bleach), pyridine compounds (Green & Clean™), phosphoric acid (Purevac™), glycolic acid, citric acid, isopropanol, chlorhexidine gluconate (Biovac™), and/or enzymes (Vacukleen™). In this case, any of these cleansers would further include one or more of the additives of the present invention.

The doser 304 can be of any suitable design. The doser may include a separator contacting chamber or may add reagent directly into collection vessel 104. In one design, the doser 304 includes inner and outer containment vessels 320*a,b* forming annulus 322 therebetween and a bed 336 of additive particles contained within the inner containment vessel 320*b*. Wastewater 328 flows in the annulus 322 between the inner and outer containment vessels, through the space 332 between the bottoms 336, 340 of the inner and outer containment vessels 320*b,a*, and through the (fluidized) bed 336 in the inner containment vessel 320*b*. In another design, the dosing occurs within the amalgam separator 104 itself.

In one configuration, the doser contacts an additive (or pH adjustor) for controlling wastewater pH. The additive can be any suitable substance for controlling pH, such as a base, e.g. hydroxides, carbonates, and phosphates with hydroxides and carbonates being preferred, or acid, e.g., organic acid and mineral acids, with mineral acids being preferred. Sufficient pH adjustor added to maintain a pH preferably ranging from about pH2 to about pH6 or from about pH8 to about pH10, depending on the application. pH adjustment is used to enhance the performance of other additives or of sorbent materials. Sorbents often work better at low pH, whereas many precipitating additives require a high pH.

In one configuration, the doser 304 contacts an oxidant with the wastewater to oxidize organic matter before passing the wastewater through the sorbent column. As will be appreciated, organic matter can clog, bio-foul, or otherwise impair the performance of the sorbent material. Any suitable oxidant can be used. Preferred oxidants include organic halogen derivatives (e.g., symclosene, oxyhalide salts (e.g., hypochlorite), ozone, hydrogen peroxide and/or organic peroxides). In typical applications, the amount of oxidant added will range from about 10 to about 1000 ppm.

In another configuration, a reductant is contacted by the doser with the wastewater to reduce mercury-containing compounds and materials. Reducing agents minimize oxidation and release of mercury from captured amalgam and helps to chemically reduce incoming oxidized mercury, thereby making it less soluble. For example, reduced elemental mercury has a very low solubility—on the order of 20 micrograms/L. Any suitable reductant can be used. Preferred reductants include stannous chloride, iron, tin oxalate, bisulfites, and/or polyvalent metals.

A reducing additive should create a solution oxidation/reduction potential capable of reducing oxidized forms of mercury back to elemental mercury. The standard electrode potentials (E°) for mercurous ($Hg_2^{++}+2e=2\overline{e}$) and mercuric ($Hg^{++}+2\overline{e}=Hg$) reduction are about +0.789 V and +0.854 V respectively. These are measured versus a standard hydrogen electrode. Thus to create a solution environment where the concentration of oxidized mercury is no greater than that for elemental mercury (the assumed minimum limit for a solution in contact with amalgam) the required potential is given by:

$$Eh = E° + 0.059 \log\left(\frac{[Hg_{oxidized}]}{a_{Hg}}\right) \quad \text{Eq. (1)}$$

at 25° C. In Equation (1), the activity of elemental mercury, $a_{Hg}$, is equal to unity by convention, and $[Hg_{oxidized}]$ represents the molar concentration of oxidized mercury. The equation is exact if species activity is used in place of concentration. Assuming a desired minimum concentration of $10^{-7}$ molar (~20 ppb), the solution Eh is preferably about $\leq +0.38$ V. In typical applications, the amount of reductant added will range from about 10 to about 1000 ppm.

In another configuration, a precipitant is contacted by the doser with the wastewater to cause precipitation of mercury-containing compounds as insoluble mercury precipitates. Any suitable precipitant can be used. Preferred precipitants include iodates, sulfides and polysulfides, thioamides (e.g., thioacetamide), carbamates and thiocarbamates (e.g., sodium diethylthiocarbamate), polycarbamates, thiocarbamides, and polymeric or immobilized variants of these functional groups and mixtures and derivatives thereof. Carbamates are preferred as they are generally nontoxic and pH insensitive. In general, the precipitant can be any chemical which forms a sparingly soluble or readily filterable complex with mercury or mercury-bearing compounds. In typical applications, the amount of precipitant added will range from about 10 to about 1000 ppm.

In some configurations, the processes and compositions of U.S. Pat. Nos. 5,880,060; 5,667,695; 5,370,827; 5,330,658; 5,080,799; 4,108,769; and/or 4,072,605, all of which are incorporated herein by this reference, are used as or in lieu of the doser.

When a precipitant is used, a particle filter, such as a fine screen or membrane, can be located in or downstream of the doser and in or upstream of the sorbent column (if a sorbent column is present) to remove precipitated mercury particles. The filter preferably has a pore size sufficient to remove the particles, which typically ranges from about 10 to about 0.45 microns. In one configuration, the particle filter is located downstream of the sorbent column (FIG. 11).

The sorbent column 308 can be of any suitable design. The sorbent column can be configured to contain one or multiple sorbent beds of the same or differing sorbents. The typical column design is a packed-bed of sorbent particles. Other column designs include monolithic sorbent structures and fluidized bed designs.

Referring to FIG. 13, the sorbent column 308 of one design includes a column housing 350, a bottom 354 having an input port 358, a top 362 having an output port 366, a plurality of retaining rings 370*a–c*, and a plurality of screens 374*a-c*. The screens prevent intermixing of the sorbent beds 380 and 384 and restrain movement of the sorbent particles in the beds so as to prevent clogging of the input port 358 or output port 366 or removal of the sorbent particles from the column with the wastewater.

The sorbent can be any sorbent capable of collecting mercury. Preferred sorbents include one or more of activated carbon, ion exchange resins such as cellulosic resins (e.g., as discussed in U.S. Pat. No. 5,907,037 which is incorporated herein by this reference) chelating resins and porous silica, and zeolites.

In a preferred configuration, the first sorbent bed 380 of activated carbon is located near the input port 358 to remove dissolved mercury and residual oxidant (if added previously by a chemical doser 304) from liquid 119 and the second sorbent bed 384 of an ion exchange resin is located above the first sorbent bed near the output port 366 to remove further dissolved mercury from liquid 119.

The purified wastewater 390 is fully compliant with pertinent environmental regulations. Typically, the purified wastewater 390 contains no more than about 10 ppb mercury.

In operation, the wastewater 328 is removed from the vessel 104 as described above and passed through the input at the top of the doser 304, through the annulus 322 and through the additive bed 336, and is removed through the output at the top of the doser 304 to form a treated wastewater. The treated wastewater 400 is introduced into the sorbent column 308 through input 358, passed sequentially first through sorbent bed 380 and second through sorbent bed 384 to form a purified wastewater 390. The wastewater is filtered with a polishing filter 308 to remove sorbent residue. Purified wastewater 390 can be discharged directly into the sewer.

EXPERIMENTAL

ISO Certification

The international organization for standardization (ISO) is a worldwide federation of national standards bodies. ISO standards provide safety and performance guidelines for a variety of equipment categories, including dental equipment. International standard ISO 11143 was prepared by the ISO dentistry technical committee to assess the performance of dental amalgam separators.

Amalgam separators are defined as items of dental equipment designed to retain amalgam particles carried by the wastewater from the dental treatment system, so as to reduce the number of amalgam particles and therefore the mercury entering the sewage system. The use of a centrifuge, filtration, sedimentation or combination of any of these methods may achieve separation of the amalgam particles.

ISO 11143 specifies requirements for amalgam separators used in connection with dental equipment in the dental treatment system. It specifies the efficiency of the amalgam separator (minimum of 95%) in terms of the level of retention of the amalgam based on a laboratory test. The standard also describes the test procedure for determining this efficiency, as well as requirements for the safe functioning of the separator, labeling, and instructions for use of the device. The ground amalgam sample for the efficiency test of the amalgam separator is divided into three different fractions:

6.0 g of particles sized 3.15 mm to 0.5 mm
1.0 g of particles sized 0.5 mm to 0.1 mm
3.0 g of particles smaller than 0.1 mm In addition, 50% of the fine fraction particles should be less than 0.01 mm. The test sample used to assess the efficiency of the amalgam separator has a particle size distribution that reflects the situation found in dental treatment systems. The size fractions used in the standard are based on investigations that have been carried out to determine the particle size distribution of amalgam particles in water from dental treatment systems.

In summer 2000, the BullfroHg™ amalgam separator was independently tested following ISO 11143. The separator received a score of 99.6% removal efficiency when empty and 98.6% efficiency when full, easily passing the required test efficiency of 95%.

ISO CERTIFICATION TEST RESULTS

| | |
|---|---|
| Reference/Equipment: | Amalgam Separator BullfroHg ™ |
| Rating: | Rated voltage: 120 V AC |
| | Rated current: 1.5 amp |
| Date of receipt: | Jun. 22, 2000 |
| Type of examination: | Alternate construction test. |
| Test regulations: | ISO 11142: 1999-12 |
| Testing period: | July/August 2000 |
| Test location: | Technology Centre of RWTUV |
| | Analagentechnik GmbH |
| | Classification: Type 2: Sedimentations |

ISO CERTIFICATION TEST RESULTS -continued

| | |
|---|---|
| | system |
| | Amalgam sample: Becker MeBtechnik |
| | GmbH, 71364 Winnenden, Germany |
| | ISO 1O g, January 2000 |
| | Maximum water floulrate: 750 ml/mn., |
| | 10 l altogether |
| | Type of membrane filters: Schleicher + |
| | Schuell Membrane filters AE 100 + ME29 + ME28 |
| | Number of tests performed: 6 |
| | Separation degrees of empty amalgam |
| | separator: after 12 to 14 hours |
| | 1. 99.9% |
| | 2. 99.7% |
| | 3. 99.3% |
| | Average 99.6% |
| | Separation degrees of full amalgam |
| | separators: after 12 to 14 hours |
| | 1. 99.0% |
| | 2. 98.0% |
| | 3. 97.9% |
| | Average: 98.3% |
| | Value of the efficiency: 98.3% |
| Annex (No. Of pages): | None |
| Test result: | The referenced units are in compliance |
| | with the above requirements. |
| | Test program ISO 11143 Denta Equipment-Amalgam Separators: 1999 |
| Test object: | Amalgam Separator Model BullfroHg ™ |
| Classification: | Type 2: Sedimentation system |
| Amalgam sample: | Becker MeBtechnik GmbH |
| | 71364 Winnenden, Germany |
| | ISO 10 g, January 2000 |
| Maximum water flow/rate: | 750 ml/min., 10 l altogether |
| Type of membrane filters: | Schleicher + Schuell |
| | Membrane Filters AE 100 + ME29 + ME28 |
| Number of tests performed: | 6 |
| Separation degrees of empty amalgam separator: after 12 to 14 hours | |
| 1. 99.9% | |
| 2. 99.75 | |
| 3. 99.3% | |
| Average: 99.6% | |
| Separation degrees of full amalgam separators after 12 to 14 hours | |
| 1. 99.0% | |
| 2. 98.0% | |
| 3. 97.9% | |
| Average. | |

Value of the efficiency: 98.3%

The BullfroHg™ Hg amalgam separator passed the test.

Figure 14:
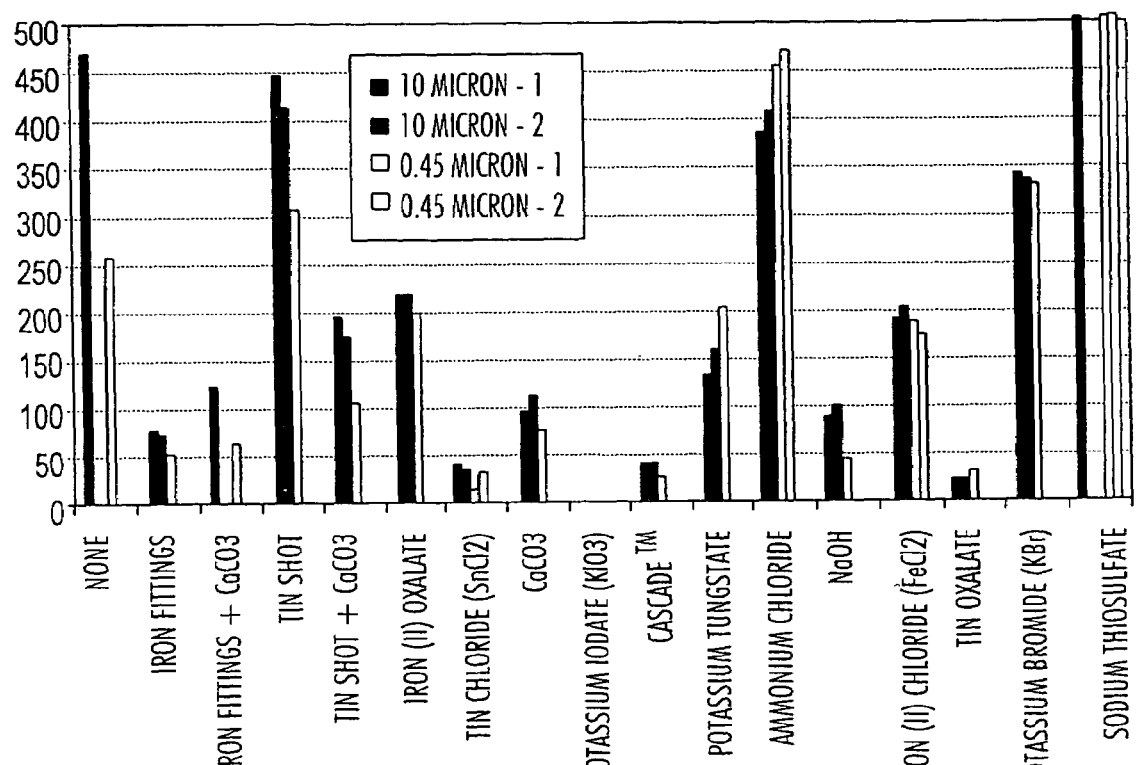
FIG. 14 is a graph of final mercury concentration (PPB) (vertical axis) against reagent (horizontal axis)

In addition to the ISO test, ADA further performed an initial screening of the doser concept. The tests were intended to demonstrate that mercury levels could be reduced by reagent addition. Dental waste from a Denver-area clinic was used in these tests. The wastewater was first ifitered through a 10-micron filter to remove large particles. Some of the wastewater was sent through a 0.45-micron filter to determine the amount of "soluble" mercury. The tests consisted of 150 mL of waste and 10 g of reagent placed into 250-mL shaker flasks. The flasks were shaken overnight and the solutions in each flask were again ifitered with a 10-micron filter to remove solids. Half of the samples were then filtered through a 0.45-micron filter. The results are plotted in FIG. 14.

Sixteen different reagent combinations were tested in these first trials. Several reduced the amount of mercury in the wastewater sample. Of those tested, iron, calcium carbonate, potassium iodate and tin oxalate appear to yield the best results. Some tested reagents successfully reduced the mercury levels, but are not believed to be practical for other reasons.

These initial tests were intended to demonstrate that mercury levels could be reduced by addition of a reagent. Reagents other than those tested are also possible.

Figure 15:
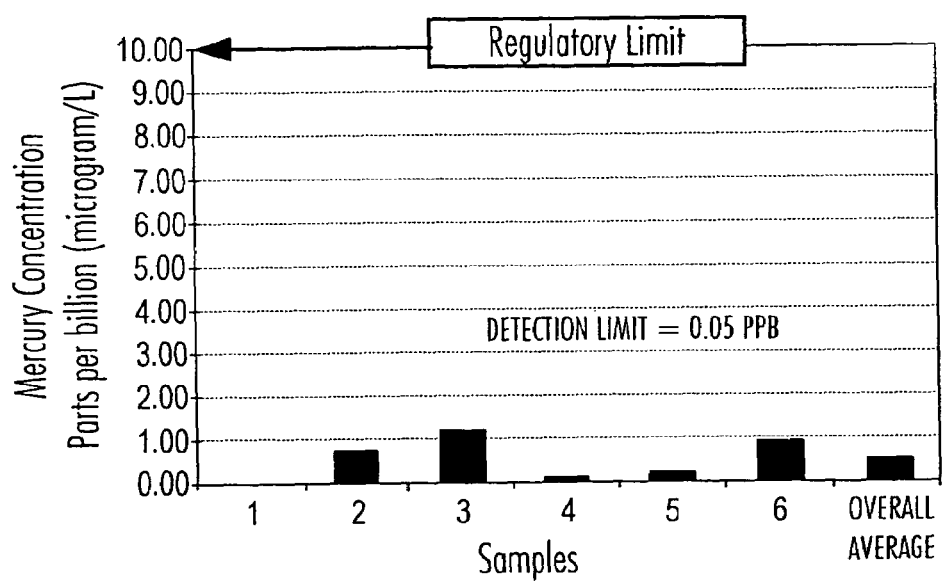
FIG. 15 is a plot of mercury concentration (ppb) (vertical axis) versus sample number (horizontal axis).

In addition to the above tests, the City of Toronto carried out independent testing of a system as depicted in FIGS. 11 and 12. The system was connected to a city dental clinic suction system and the effluent 390 was analyzed for total mercury concentration. The results are depicted in FIG. 15. The system consistently reduced the mercury concentration to less than 10 micrograms per liter—levels that cold not be achieved through particle separation alone.

The foregoing description of the present invention has been presented for purposes of illustration and description. Furthermore, the description is not intended to limit the invention to the form disclosed herein. Consequently, variations and modifications commensurate with the above teachings, in the skill or knowledge of the relevant art, are within the scope of the present invention. For example, the particulate collection vessel can be used without the addition of an additive or the use of a sorbent. The embodiments described here and above are further intended to explain best modes for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A process for removing a contaminant from a three-phase dental effluent, comprising:
    transporting a three-phase effluent from dental work on a patient through a suction line into a collection vessel, wherein the effluent comprises one or more contaminants;
    contacting a liquid phase of the three-phase effluent with at least one reagent;
    introducing the three-phase effluent into the collection vessel, wherein the three-phase effluent separates into a solid phase, the liquid phase, and a gas phase in the collection vessel and the at least one reagent comprises at least one of an agglomerating agent and a precipitating agent to improve the collection efficiency for one or more contaminants;
    removing the gas phase from the collection vessel; and
    removing the liquid phase from the collection vessel, wherein the at least one reagent is contained in a line cleaning solution and wherein the line cleaning solution is introduced into the suction line in the contacting step.

2. The process of claim 1, wherein the at least one reagent comprises the precipitating agent and reacts with mercury-containing compounds in the three-phase effluent to form a mercury-containing precipitate.

3. The process of claim 2, wherein the reagent is one or more of an iodate, a polysulfide, a sulfide other than a polysulfide, a thioamide, a carbamate other than a thiocarbamate, a thiocarbamate, a thiocarbamide, and polymeric or immobilized variants of the foregoing.

4. The process of claim 1, wherein the at least one reagent comprises a reducing agent to reduce oxidized mercury-containing compounds.

5. The process of claim 4, wherein the at least one reagent comprises a polyvalent metal.

6. The process of claim 4, wherein the at least one reagent is one or more of stannous chloride, iron, tin oxalate, and a bisulfite.

7. The process of claim 4, further comprising:
    maintaining an oxidation-reduction potential, Eh, of the liquid phase of no more than about 0.38 Volts.

8. The process of claim 1, wherein the suction line cleaning solution comprises one or more of sodium hydroxide, chloramine T, a percarbonate, sodium perborate, hydrogen peroxide, ammonium chloride, sodium hypochlorite, pyridine compounds, phosphoric acid, glycolic acid, citric acid, isopropanol, chlorhexidine gluconate, and enzymes.

9. The process of claim 1, wherein the suction line cleaning solution comprises a pH adjustor and further comprising:
    maintaining a pH of the liquid phase in the range of from about pH 8 to about pH 10.

10. The process of claim 9, wherein the pH adjustor comprises at least one of a hydroxide, a carbonate, and a phosphate.

11. The process of claim 1, wherein the at least one reagent comprises an agglomerating agent.

12. The process of claim 11, wherein the agglomerating agent is a flocculant.

13. The process of claim 12, wherein flocculant is a polymeric flocculant.

14. The process of claim 1, wherein the contaminant is a metal.

15. The process of claim 14, wherein the contaminant is one or more of mercury, lead, and arsenic.

16. A process for removing a contaminant from a three-phase dental effluent, comprising:
    transporting a three-phase effluent from dental work on a patient through a suction line into a collection vessel, wherein the effluent comprises one or more contaminants;
    contacting a liquid phase of the three-phase effluent with at least one reagent, wherein the at least one reagent comprises a reducing agent to reduce oxidized forms of mercury to elemental mercury;
    after the contacting step, maintaining an oxidation-reduction potential Eh of a liquid phase of the effluent to no more than about 0.38 Volts;
    introducing the three-phase effluent into the collection vessel, wherein the three-phase effluent separates into a solid phase, the liquid phase, and a gas phase in the collection vessel;
    removing the gas phase from the collection vessel; and
    removing the liquid phase from the collection vessel, wherein the at least one reagent is contained in a line cleaning solution and wherein the line cleaning solution is introduced into the suction line in the contacting step.

17. The method of claim 16, wherein the at least one reagent comprises at least one of an agglomerating agent and a precipitating agent.

18. The process of claim 17, wherein the at least one reagent comprises the precipitating agent and reacts with mercury-containing compounds in the three-phase effluent to form a mercury-containing precipitate.

19. The process of claim 18, wherein the reagent is one or more of an iodate, a polysulfide, a sulfide other than a polysulfide, a thioamide, a carbamate other than a thiocarbamate, a thiocarbamate, a thiocarbamide, and polymeric or immobilized variants of the foregoing.

20. The process of claim 17, wherein the at least one reagent comprises an agglomerating agent.

21. The process of claim 20, wherein the agglomerating agent is a flocculant.

22. The process of claim 21, wherein flocculant is a polymeric flocculant.

23. The process of claim 16, wherein the reducing agent comprises a polyvalent metal.

24. The process of claim 16, wherein the reducing agent is one or more of stannous chloride, iron, tin oxalate, and a bisulfite.

25. The process of claim 16, wherein the suction line cleaning solution comprises one or more of sodium hydroxide, chloramine T, a percarbonate, sodium perborate, hydrogen peroxide, ammonium chloride, sodium hypochlorite, pyridine compounds, phosphoric acid, glycolic acid, citric acid, isopropanol, chlorhexidine gluconate, and enzymes.

26. The process of claim 16, wherein the suction line cleaning solution comprises a pH adjustor and further comprising:

maintaining a pH of the liquid phase in the range of from about pH 8 to about pH 10.

27. The process of claim 26, wherein the pH adjustor comprises at least one of a hydroxide, a carbonate, and a phosphate.

28. The process of claim 16, wherein the contaminant is a metal.

29. The process of claim 28, wherein the contaminant is one or more of mercury, lead, and arsenic.

* * * * *